United States Patent
McGahee

(10) Patent No.: US 7,434,396 B2
(45) Date of Patent: Oct. 14, 2008

(54) ECONOMY OF MOTION MACHINE

(76) Inventor: Welbourne McGahee, 1896 Coolidge Ave., Melbourne, FL (US) 32935

( * ) Notice: Subject to any disclaimer, the term of this patent is extended or adjusted under 35 U.S.C. 154(b) by 175 days.

(21) Appl. No.: 11/451,436

(22) Filed: Jun. 13, 2006

(65) Prior Publication Data
US 2007/0283689 A1 Dec. 13, 2007

(51) Int. Cl.
*F03C 1/00* (2006.01)

(52) U.S. Cl. ........................................................ 60/495

(58) Field of Classification Search ............. 60/495–507
See application file for complete search history.

(56) References Cited

U.S. PATENT DOCUMENTS

| | | | |
|---|---|---|---|
| 271,040 A | 1/1883 | Cook | |
| 272,656 A | 2/1883 | Cook | |
| 1,708,807 A | 4/1929 | Tatay | |
| 2,513,136 A | 6/1950 | Borsos | |
| 2,850,261 A | 9/1958 | Rutkove | |
| 3,907,454 A | 9/1975 | Punton | |
| 3,934,964 A | 1/1976 | Diamond | |
| 4,084,375 A | 4/1978 | Horvath | |
| 4,326,132 A | 4/1982 | Bokel | |
| 4,363,212 A | 12/1982 | Everett | |
| 4,713,937 A * | 12/1987 | De Shon | 60/495 |
| 4,718,232 A | 1/1988 | Willmouth | |
| 4,742,242 A | 5/1988 | De Shon | |
| 4,981,015 A * | 1/1991 | Simpson | 60/496 |
| 5,685,147 A * | 11/1997 | Brassea | 60/496 |
| 5,899,066 A | 5/1999 | Brassea-Flores | |
| 5,944,480 A * | 8/1999 | Forrest | 415/5 |
| 6,305,165 B1 | 10/2001 | Mizuki | |
| 6,447,243 B1 | 9/2002 | Kittle | |
| 7,134,283 B2 * | 11/2006 | Villalobos | 60/639 |
| 2003/0145589 A1 | 8/2003 | Tillyer | |
| 2005/0252206 A1 | 11/2005 | Holmevik | |
| 2006/0064975 A1 | 3/2006 | Takeuchi | |

FOREIGN PATENT DOCUMENTS

| | | |
|---|---|---|
| BE | 562833 | 12/1957 |
| FR | 542768 | 8/1921 |
| JP | 57129272 | 8/1982 |

* cited by examiner

*Primary Examiner*—Hoang M Nguyen
(74) *Attorney, Agent, or Firm*—Harold Gell, P.C.; Harold Gell

(57) ABSTRACT

The invention is a method and apparatus for extracting power from a buoyant source within a contained column of liquid. It is comprised of an endless chain of movable buoyant objects, a means to convert the movement of the chain into useful work and a tank filled with a constant volume column of water. The buoyant objects comprising the chain sequentially enter the bottom of the water column, move up through the column and emerge at the surface. The emerging buoyant objects leave the tank and are directed to the tank bottom were each buoyant object repeats the cycle. As the chain of buoyant objects cycle through the water column, the volume of water remains constant, with one buoyant object of the chain entering the bottom of the water column as one is exiting at the top surface. The movement of the chain is a function of the buoyancy of the buoyant objects and the movement is converted to work by any conventional means using a rotary drive or linear escapement motor.

15 Claims, 7 Drawing Sheets

US 7,434,396 B2

ECONOMY OF MOTION MACHINE

BACKGROUND OF THE INVENTION

1. Field of the Invention

The invention relates to a method and apparatus for producing energy without creating pollution or using any known consumables currently employed to produce energy. It is a means and apparatus for extracting energy as a function of the relative density between an object and a fluid, e.g., displacement of water. It is a more efficient way of extracting potential energy from a mass of water than the ancient water wheel or modern turbine.

2. Discussion of the Related Art

Water has been used by man for centuries to do work and create energy. This has always been accomplished as a function of gravity induced motion of the water. The earliest known devices were simple water wheels which have evolved into modern turbines used in hydroelectric systems employing massive dams. These devices are very inefficient. Potential energy is lost as water flows past the paddles or turbine blades behind the mass of water causing the paddle or blade to move and before the next paddle or blade is in position to be fully engaged by the flowing water.

More recently, tide machines have been used to create energy by displacement. The displacement in such devices is not of water but of a buoyant device. Water has only been thought of as a means to float something, i.e, a displacer. Displacement of liquid was done from the top down and this displacement is what causes the displacer to be lifted in a tide machine where the displacer is less dense than the liquid. The present invention is a breakthrough in displacement practices. The displacer is allowed to move upwards while displacement of the water remains constant.

OBJECTIVES OF THE INVENTION

The principal objective of the present invention is to improve the means of producing energy and to eliminate entirely the consuming of any and all types of combustible fuels to produce power.

Another objective is to totally eliminate the pollution caused by all presently used fuels used for producing energy which causes pollution.

A primary objective is to produce power from the effective buoyancy of a constrained object immersed in a liquid.

A still further objective of the invention is to produce power from energy resulting from the differential density between a solid and a liquid.

Other objectives and advantages will become apparent as the disclosing of this new means is considered with the accompanying drawings.

SUMMARY OF THE INVENTION

In the Economy of Motion Machine, displacement is held constant while a chain of buoyant displacers move up in the displaced water column. Upon emerging from the water column, the chain of displacers passes out of the tank and over an idle wheel. Simultaneously, the chain of displacers passes around a second idle wheel and by way of an air lock, into the water column. This goes on as long as desired. Water that leaks past the seals of the air lock is replaced by a pump assembly which draws water from a leak-water collecting reservoir placed lower than the air lock or by gravity from a man-made or naturally occurring source. Either or both idle wheels may drive an electric generator or directly power a machine requiring a rotary input driving means. Alternatively, work may be extracted from the moving chain as from a linear escapement motor.

DESCRIPTION OF THE PREFERRED EMBODIMENT

Figure 1:
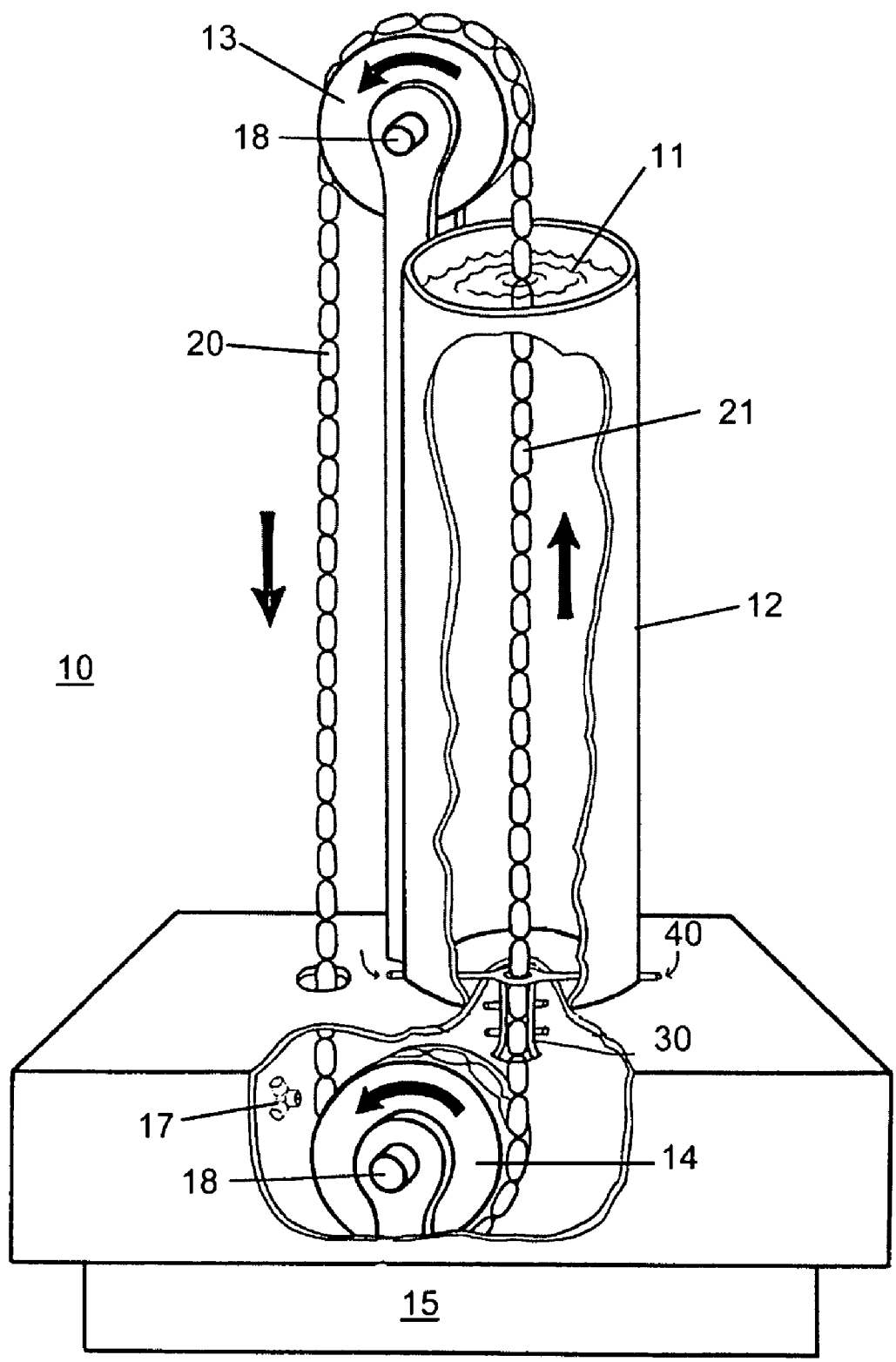
FIG. 1 is a cutaway view of the Economy of Motion Machine illustrating the major components thereof.

Referring more particularly to the drawings wherein similar reference characters designate like parts throughout the several views.

The Economy of Motion Machine, 10 of FIG. 1, allows the displacing elements 21 forming the displacement chain 20 to move up through the water column 11 as a function of the combined buoyancy of the immersed displacing elements. During this process, the total displacement of water in the upper water tank 12 remains constant. A process clearly unlike other known displacement devices.

An upper idler wheel 13 guides the displacement chain in a 180° arc, allowing the mass of the displacing elements 21 to force the displacement chain 20 down on one side of the upper idler wheel as the buoyancy of the displacing elements on the other side pulls the displacement chain around the lower idler wheel 14 and up through the water column 11. This goes on constantly or as long as desired.

Each displacing element 21 of the displacement chain 20 enters the bottom of the water column 11 by way of an airlock 30 and seal 40. This minimizes the force required to inject a displacing element into the bottom of the water column. The airlock is dimensioned relative to the displacing elements to minimize the amount of water that can be lost during airlock cycling. This lost water is recovered by the lower water tank 15 from where it is returned to the water column 11 by a pump 17 which is driven directly by the lower idler wheel 14 or linear escapement motor or indirectly by an electric motor powered by a generator driven by the upper or lower idler wheel shaft 18.

The mass of the water lost by a single cycle of the airlock chamber is minimized by the efficiency of the airlock chamber seal 40. In a preferred embodiment, the buoyant force, $w_B$, created by a displacing element is significantly greater than the forces, $w_U$ and $w_L$, required to turn the upper and lower idler wheels, the force, $w_P$, required to drive the pump to lift the mass of water lost during a cycle to the top of the water column, and the force, $w_S$, required to regulate the seal pressure and pass the displacing element 21 into the water column 11, i.e., $w_B$ is greater than $w_U+w_L+w_P+w_S$. The surplus force, $w_T=w_B-(w_U+w_L+w_P+w_S)$, is the amount of useful work the system can preform. Thus $w_T$ is a function of the density relative to the immersing liquid and size of a displacing element minus the various system losses.

The surplus force, $w_T$, may be extracted from the system via a mechanical coupling to either/or both drive shafts 18 which are extensions of the axles for the upper and lower idler wheels 13 and 14. The mechanical coupling may drive any form of mechanical device capable of operating from a rotary input or it may be an electric generator or alternator.

In the preferred embodiment, water lost by air chamber cycling is not recaptured and returned to the upper water tank 12. It is allowed to flow away from the system to be used for whatever purpose is most beneficial. Replacement water to the upper tank is provided by gravity feed from any available source located at an elevation higher than the upper water tank. Examples of such water sources are: elevated rainwater collecting cisterns, lakes, ponds, rivers, streams, etc. Using naturally occurring water sources to replenish the upper water column 11 eliminates $w_P$ from the work force equation and thus maximizes the systems ability to preform useful work $w_T$.

In a typical reduction to practice, the invention uses displacing elements 21, each of which displace 800 gallons of water plus the volume of the material forming the displacer and therefore each provide a buoyant force $w_B$ equal to the weight of the displaced water minus the weight of the displacer, assuming the liquid forming the column is water. The weight of the displacing elements 21 does not have to be considered further because, as can be seen in FIG. 1, the number of displacing elements of chain 20 on one side of the upper idler wheel 13 equals the number on the other side. Thus the total weight of the displacers being pulled down by gravity on one side equals the weight of the displacers on the other and the system is in balance, leaving only the buoyant force as calculated according to Archimedes' principle. In the exemplary system, the water column is high enough to immerse 18 displacing elements 21 of the chain 20 to provide a force $w_B$ of 101,664 pounds, assuming the water being used in column 11 weighs 8 pounds per gallon.

When a displacer 21 enters the water column 11, it displaces a volume of water equal to the displacer's total volume, i.e., the volume inside the displacer plus the volume of the material forming the displacer. The mass (weight) of the of the displacer divided by the mass (weight) of the displaced water equals the specific gravity (Sp. gr.) of the displacer. The displacer's buoyancy in water is a function of the displacer's specific gravity. When this value is less than 1, the specific gravity of water, the displacer is positively buoyant. More simply, the buoyant force exerted by a displacer is equal to the weight of the displaced water minus the weight of the displacer. Assuming the displacer is made of common rolled steel with a density of 7,850 Kg/m$^3$ or 0.58 lbs/in$^3$ and it weighs 800 pounds, then the approximate volume of the material from which the displacer is made is 1,379 cubic inches. The volume of the displacer's interior is equal to 800 gallons water, which is equal to 184,800 cubic inches, so the approximate total volume of a displacer is 186,180 cubic inches or 806 gallons. Therefore the exemplary displacer 21 displaces 806 gallons of water which, at 8 pounds per gallon, weights 6,448 pounds. According to Archimedes' principle, the buoyant force exerted by water is equal to the mass of the displaced water minus the mass of the displacer. In the exemplary case, the buoyant force of a single displacer is the 6,448 lbs of water displaced minus the 800 pound displacer for a buoyant force of 5,648 pounds. The water column in the example holds 18 displacers of the displacer chain to generate a total force of 101,664 pounds. The foregoing assumes a constant temperature of 4° C., a temperature at which the specific gravity of water is unity.

In a preferred embodiment representing the best mode of practicing the invention, the average specific gravity of all of the elements and voids comprising a liquid displacer is less than unity. Thus the specific gravity of each liquid displacer is less than the specific gravity of the liquid in the column when the liquid is water. The liquid may be other than water, the only controlling criteria is that the specific gravity of each liquid displacer is less than the specific gravity of the liquid, i.e., the gross density of each liquid displacer is less than the density of the liquid of the column.

Figure 2:
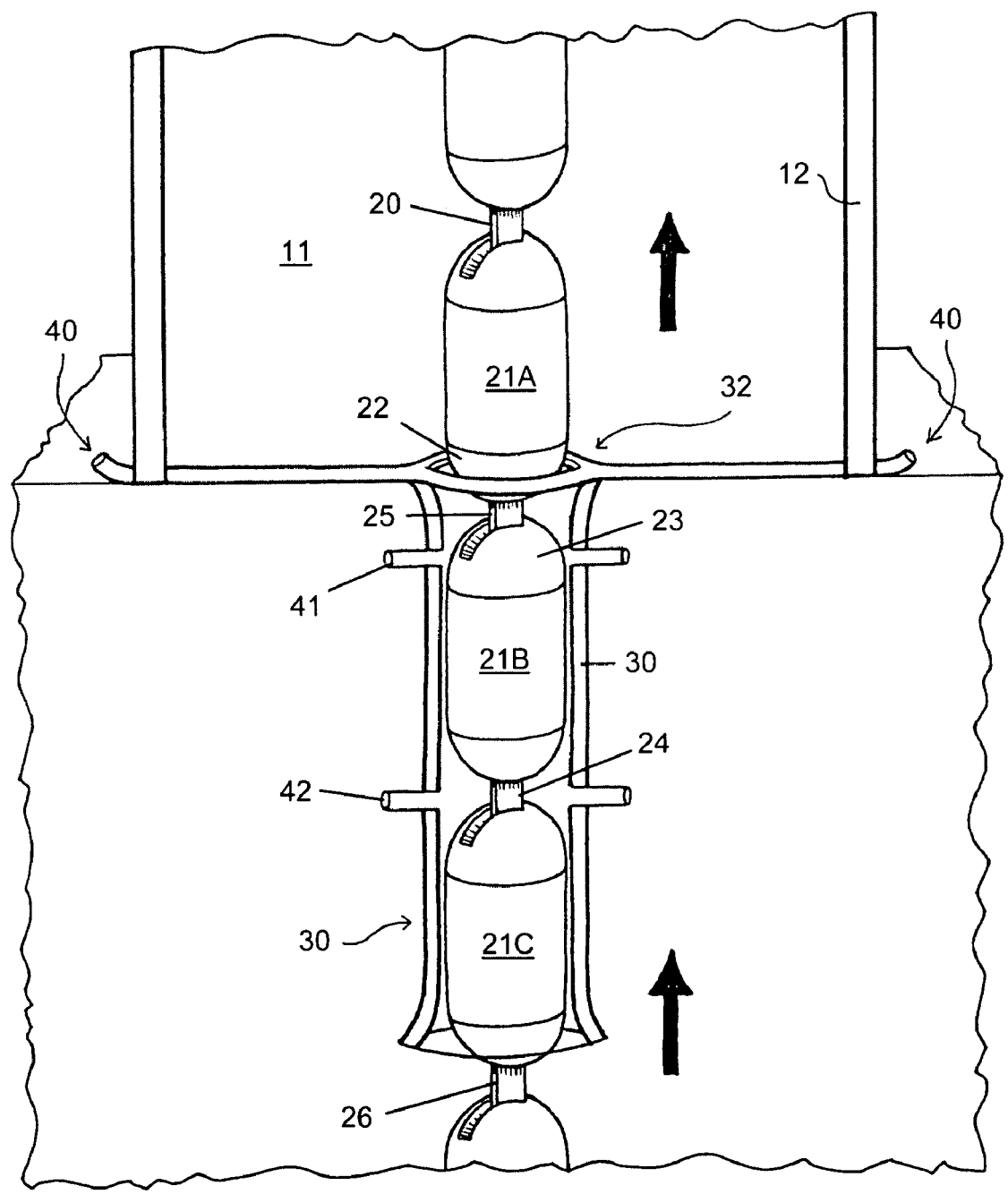
FIG. 2 illustrates the chain of displacers configured with the domed end-cap displacer embodiment entering the water column through the air lock.

The means by which the chain of displacers 20 enter the water column is illustrated by FIG. 2 which depicts displacers passing through the airlock 30. In the best reduction to practice, the airlock is a tubular structure 31 sealed around an opening 32 in the bottom of the water tank 12. Three seals, 40, 41 and 42, effect the airlock function in this embodiment by sequentially opening and closing as the displacers of the chain 20 move up into the water column 11. The airlock sequence starts with seal 40 forming a water tight barrier around the base end cap 22 of displacer 21A, seal 41 closed about the upper end cap 23 of displacer 21B and seal 42 tightly pressed around the coupling link 24 forming the chain link connection joining displacer 21C to displacer 21B. As the displacer chain moves up, seal 40 closes about coupling link 25 while seal 41 remains around displacer 21B and seal 42 engages the upper end cap of displacer 21C. Seals 41 and 42 remain tightly closed about dispersers 21B and 21C as the chain moves up and seal 40 closes about displacer 21B as it enters the water column, preventing water leakage. As the upward movement of the chain continues, seal 42 slips off disperser 21C and closes about coupling link 26, completing the cycle admitting one disperser into the bottom of the water column. During this process, the level of water in the water tank 12 remains constant because as one disperser enters through the airlock, one disperser exits at the top of the water column and no energy is lost as the disperser enters the bottom of the water column, i.e., the total dispersment of water in the tank remains constant.

Figure 3:
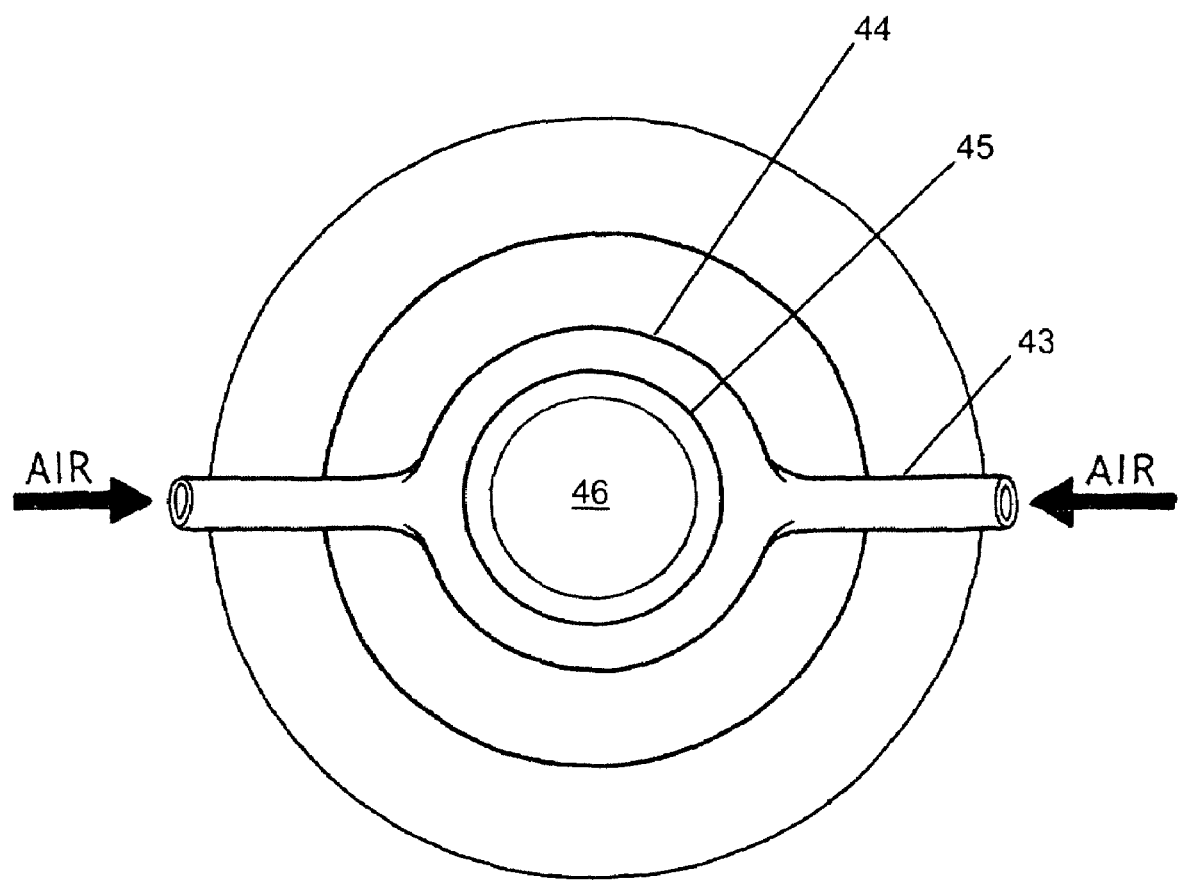
FIG. 3 is a top view of the seal assembly from inside the tank.

In the preferred embodiment the airlock seals, 40, 41, 42, are air pressure actuated, see FIG. 3. Each seal has one or more compressed airlines 43 capable of supplying air under pressure to the main body of the seal. The main seal body is comprised of a ridged ring 44 surrounding an expandable circular member 45 which forms an opening 46 through which a disperser may pass. The circular member 45 is inflated by pressurized air supplied via the airline 43 which, because of the ridged ring, expands only toward the center. The expandable circular member 45 is capable of expanding under the influence of pressurized air to completely close opening 46 to form a water tight seal around a disperser or coupling link. The flexible circular member may be inflated sufficiently to cause it to close about the coupling links and maintained to also seal about the dispersers. This mode of operation requires no further action once the seal is initially inflated. In a preferred method of operation, air pressure in the expandable circular member 45 is varied to provide a water tight seal about the various diameters passing therethrough while offering the least amount of resistance to the disperser chain movement.

The end caps of the dispersers and links joining them in the disperser chain are designed to effect the maximum number of dispersers in a given length and allow free passage around the idler wheels. For instance, a simple dome shaped end cap embodiment is illustrated in FIG. 2. The diameter and radius of curvature of the upper and bottom end caps, 23 and 22, is a function of the diameter of the idler wheels 13 and 14 and length of the coupling links. The coupling links are as short as practical to provide the densest disperser population in a given length of chain and the curve of the end caps is selected to avoid binding as the chain passes around the idler wheels.

Figure 4:
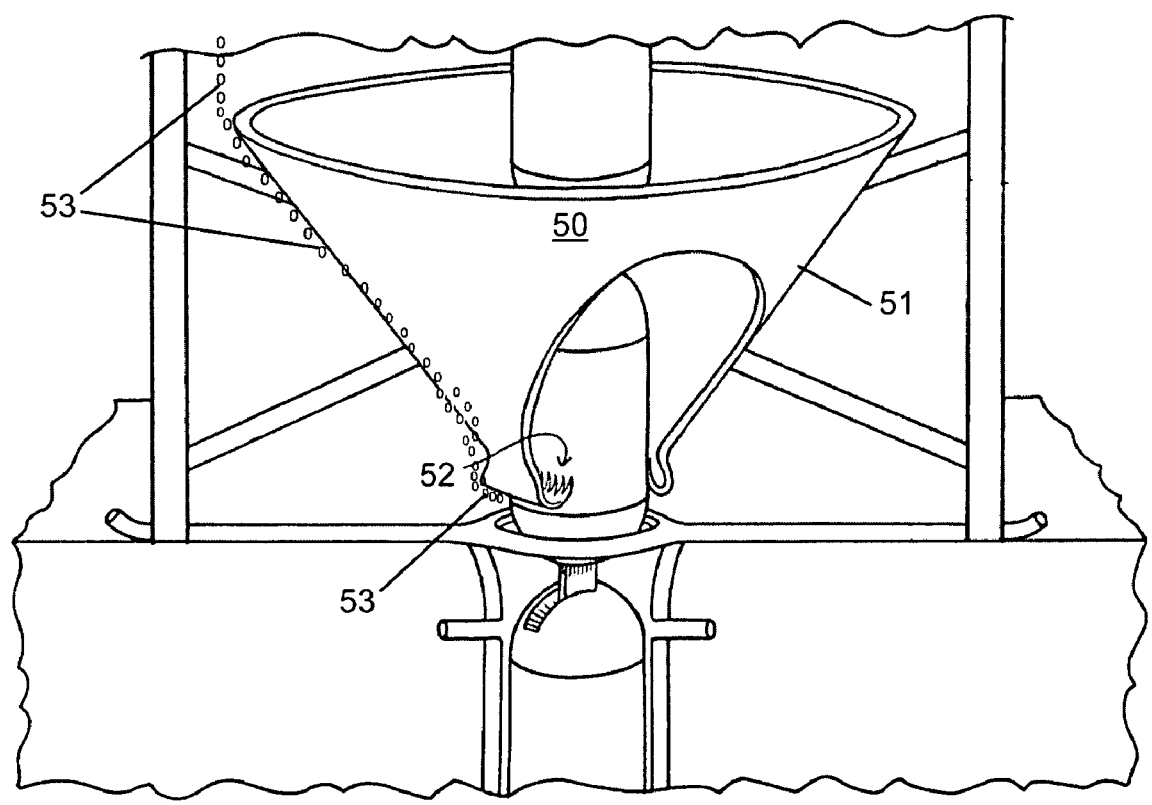
FIG. 4 illustrates the air deflector in the base of the water column.

The airlock seals are extremely efficient, but they may allow a small amount of air to enter the upper tank as the disperser chain advances. This will cause a curtain of bubbles to surround the disperser chain. The bubbles will decrease the chain's buoyancy in the same way that a mass of methane gas bubbles have been shown to cancel the buoyancy of a ship at sea and cause it to sink. The occurrence of this phenomenon is eliminated in the preferred embodiment by a funnel shaped deflector 50 of FIG. 4.

The deflector 50 is comprised of an inverted frustum of a cone 51 with a circle of inwardly directed fingers 52. The fingers form a scrubber which scrapes bubbles 53 from the surface of dispersers as the disperser chain moves upward through the deflector. The bubbles accompanying the disperser chain are forced away from the chain by the inverted cone shape of the deflector to eliminate any negating effect they may have on the buoyancy of the chain of dispersers. It has been demonstrated in "Bermuda Triangle" related experiments that a curtain of bubbles can significantly reduce the buoyancy of a floating object.

Figure 5:
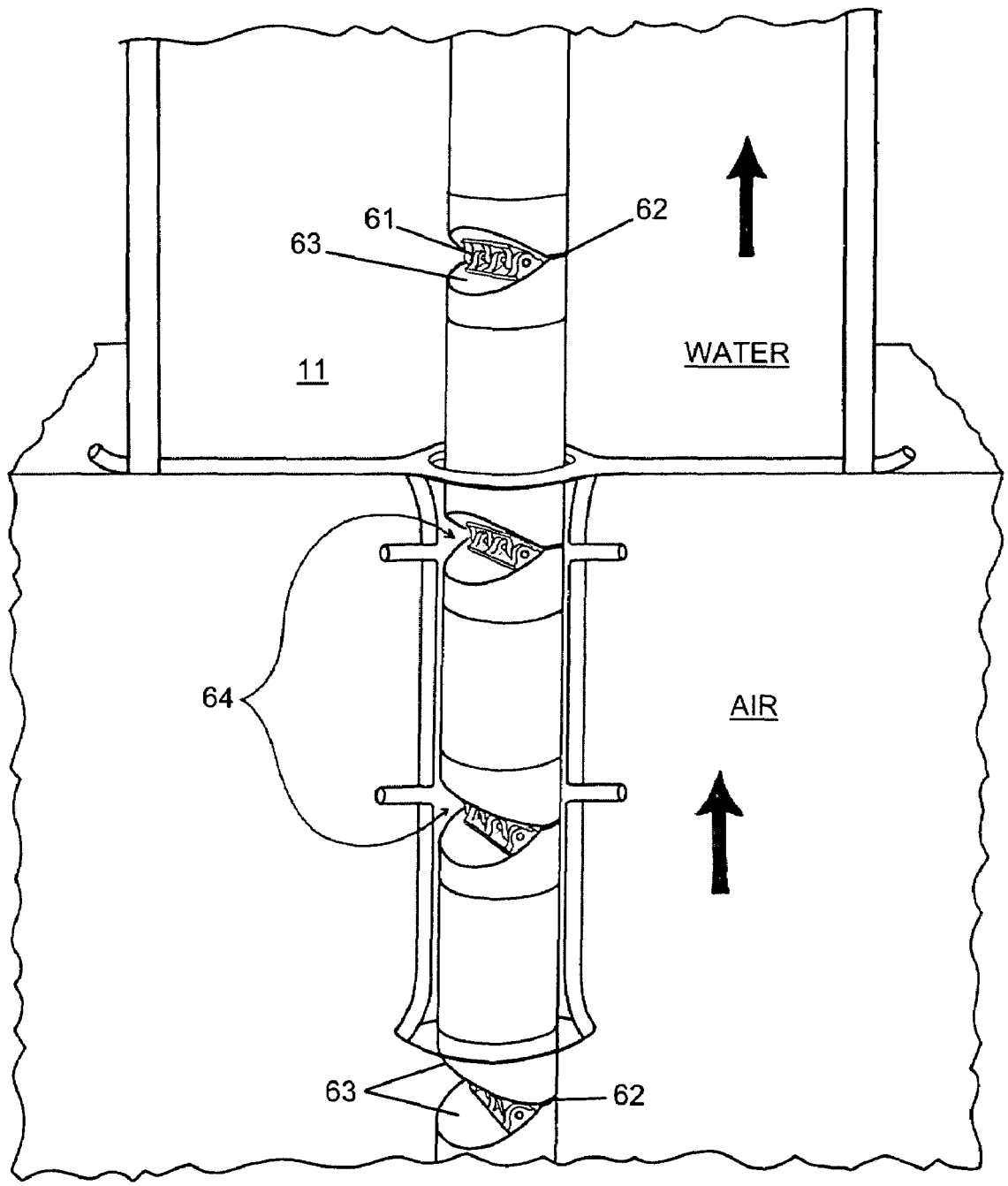
FIG. 5 illustrates an alternate displacer end-cap design in a chain going up through the air lock to enter the water tank via the seal assembly.

FIG. 5 illustrates an alternate embodiment of disperser end caps. In this embodiment the upper and bottom end caps are identical, as in the previous embodiment, but they are not domed and are coupled into a chain by hinge members 61 instead of simple coupling links. They incorporate two flat surfaces in different plains and the hinge members are positioned to allow flat surfaces 62 of adjoining dispersers to be parallel in straight sections of the chain and closely adjacent to maximize the disperser density and thus the power produced by the economy of motion machine. The angle between the flat surface 62 and the flat surface 63 forming the end of the end cap is selected as a function of the radius of curvature of the idler wheels. The included angle 64 between the two surfaces is as large as possible to maximize buoyancy by minimizing the volume between surfaces 63 in straight sections of the chain and allow easy passage around the idler wheels.

Figure 6:
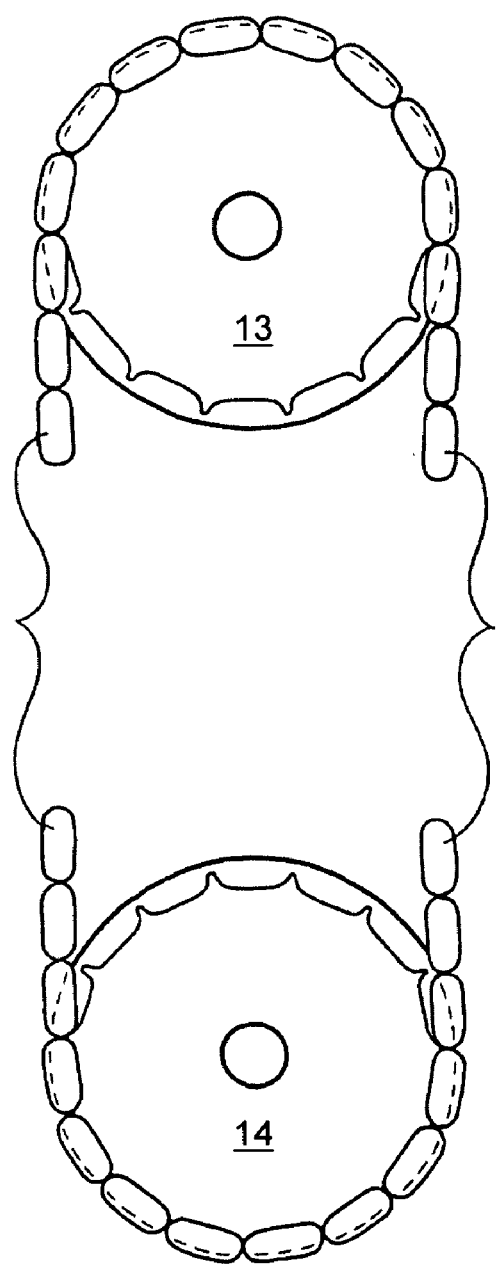
FIG. 6 illustrates a domed displacer end-cap design in a chain passing around the upper and lower idler wheels.
Figure 7:
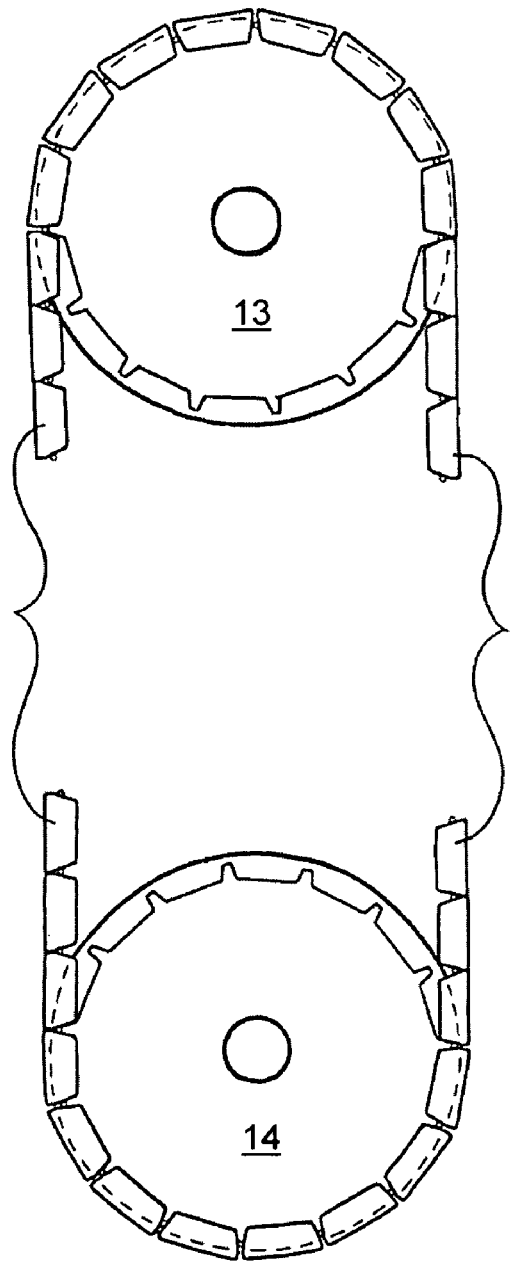
FIG. 7 illustrates an alternate displacer end-cap design incorporating flat end surfaces in a chain passing around the upper and lower idler wheels.

A comparison of FIGS. 6 (domed end cap embodiment) and 7 (flat surface end caps) provides a rough indication of the buoyancy increase afforded by the flat surface end cap embodiment. This increase comes at a cost of increased precision and complexity required during manufacturing. Therefor, the best mode of implementation of the invention is a function of many considerations and one of the most important is size.

Figure 8:
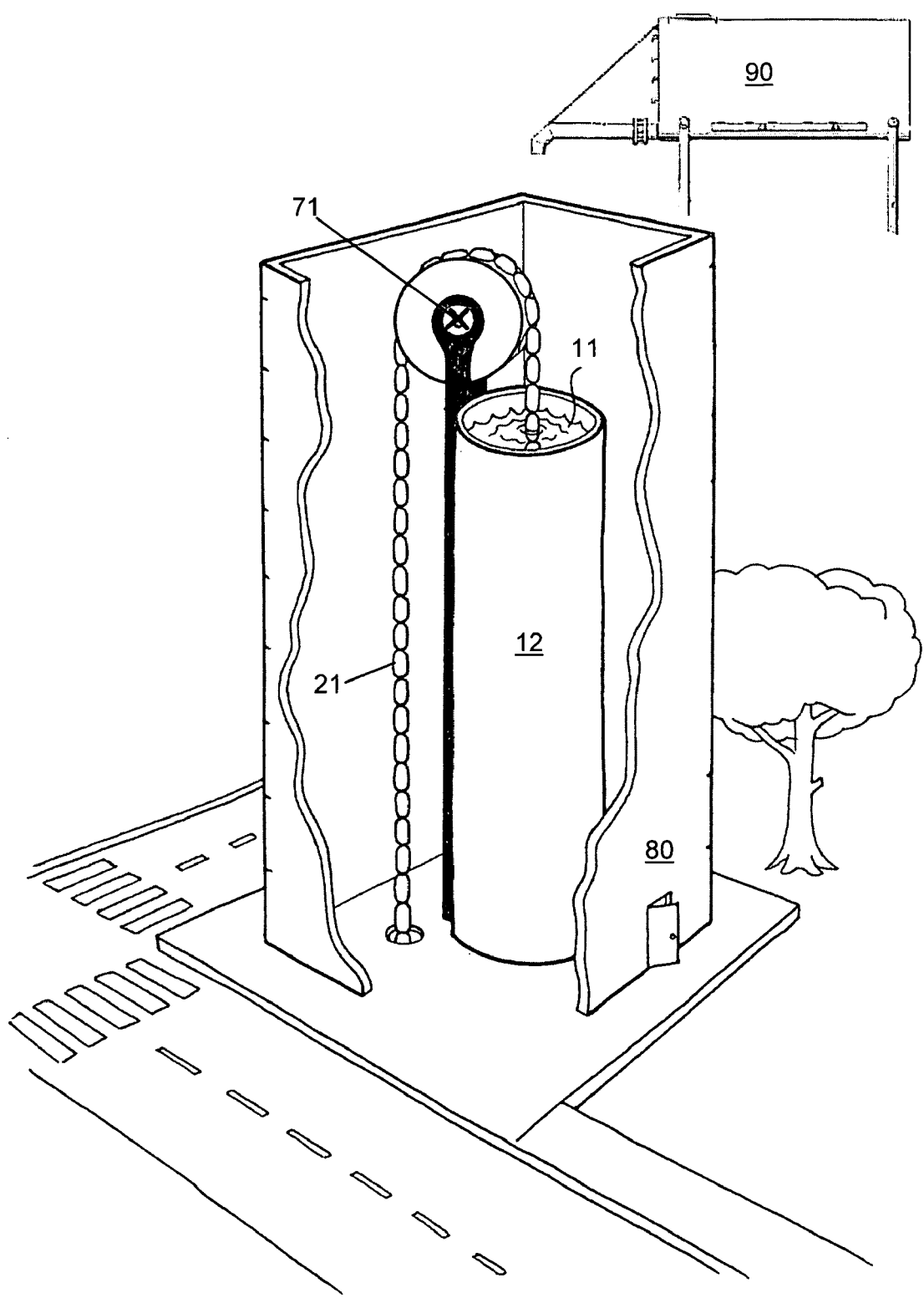
FIG. 8 is a cutaway view of the Economy of Motion Machine illustrating its optimum size relative to a two lane road and tree.

FIG. 8 illustrates a typical installation as might be employed to provide electrical power to a community. The size of the water tank 12 and displacers 21 in this application are large and dictated by the size of the generator 71 required to satisfy the needs of the community. The protective building 80 housing the economy of motion machine is not a necessity, it's a function of the environment. Such a structure may be required to prevent freezing in some parts of the world or it may be required to prevent evaporation in arid climates. The water reservoir 90 for supplying startup and replacement liquid for liquid lost by evaporation or airlock seal leakage is positioned above the top of the tank 12 to permit filling and refilling via gravity flow. The water reservoir 90 is illustrated as a water storage tank, but that is for exemplary purposes. Replacement liquid may by provided by such man made means or natural means such as a lake, river, stream, etc.

To start the Economy of Motion Machine, the water is pumped or allowed to flow into the tank 12 after air under sufficient pressure is forced into the seals of airlock 30, see FIG. 1. As the water covers the top of airlock and starts to envelop the first displace 21A of FIG. 2, the buoyancy of that displacer increases as the water rises around it. As more and more displacers are submerged, the speed and power of the machine increases until the water level in the tank reaches the maximum. The machine continues to run until stopped by draining the water tank 12.

While preferred embodiments of this invention have been illustrated and described, variations and modifications may be apparent to those skilled in the art. Therefore, I do not wish to be limited thereto and ask that the scope and breadth of this invention be determined from the claims which follows rather than the preceding description.

What is claimed is:

1. A buoyancy driven apparatus, comprising:
   a tank;
   a column of liquid contained within said tank;
   a plurality of liquid displacers connected to form an endless chain;
   an airlock means comprising a variable geometry inflatable seal for admitting said displacers of said chain sequentially into the lower portion of said column of liquid;
   said variable geometry inflatable seal of said airlock means comprises sealing means for minimizing the amount of liquid escaping from said tank as each of said displacers enter said column of liquid;
   said sealing means includes a plurality of said variable geometry inflatable seals, each configured as a doughnut with a hole who's dimensions vary as a function of pneumatic pressure within said doughnut structure; and
   means to guide said endless chain from the bottom to the top of said column of liquid and externally of said column of liquid from the top to the bottom thereof whereby each of said liquid displacers comprising said endless chain sequentially enter a lower section of said column of liquid via said airlock and exit the top of said column of liquid.

2. A buoyancy driven apparatus as defined by claim 1, wherein the specific gravity of each of said liquid displacers is less than the specific gravity of said liquid.

3. A buoyancy driven apparatus as defined by claim 1, wherein the gross density of each of said liquid displacers is less than the density of said liquid.

4. A buoyancy driven apparatus as defined by claim 1, wherein the average specific gravity of all of the elements and voids comprising each of said liquid displacers is less than unity and said liquid is water.

5. A buoyancy driven apparatus as defined by claim 4, wherein said liquid is water.

6. A buoyancy driven apparatus as defined by claim 1, comprising:
   means for returning said escaping liquid to said tank.

7. A buoyancy driven apparatus as defined by claim 6, wherein said means for returning said escaping liquid comprises:
   a collection means in the form of a lower tank positioned below said tank for collecting said escaping liquid; and
   pump means for returning said escaping liquid collected in said lower tank to said tank.

8. A buoyancy driven apparatus as defined by claim 7, comprising:

means for driving said pump by a mechanical coupling means driven by the motion of said endless chain.

9. A buoyancy driven apparatus as defined by claim 7, wherein said pump means is driven by an electric motor, comprising:
   an electricity producing means driven by the motion of said endless chain and said electric motor is powered by said electricity producing means.

10. A buoyancy driven apparatus as defined by claim 1, comprising:
   means for replacing said escaping liquid.

11. A buoyancy driven apparatus as defined by claim 10, wherein said means for replacing said escaping liquid comprises;
   a liquid source located above said tank, and
   gravity feed means for transferring liquid from said source to said tank as need to replace said escaping liquid.

12. A buoyancy driven apparatus as defined by claim 1, wherein said means to guide said endless chain comprises an upper idler wheel and a lower idler wheel, further comprising:
   at least one shaft rotated by one of said idler wheels for converting the potential energy of said moving endless chain into a force for actuating a mechanically driven machine.

13. A buoyancy driven apparatus as defined by claim 1, wherein said means to guide said endless chain comprises an upper idler wheel and a lower idler wheel, further comprising:
   at least one shaft rotated by one of said idler wheels for converting the potential energy of said moving endless chain into a force for actuating a means for generating electricity.

14. A buoyancy driven apparatus, comprising:
   a tank;
   a column of liquid contained within said tank;
   an airlock located in a lower section of said tank;
   said airlock including a plurality of variable geometry inflatable seals;
   a plurality of liquid displacers connected to form an endless chain;
   said variable geometry inflatable seals of said airlock comprise sealing means for minimizing the amount of liquid escaping from said tank as each of said liquid displacers enter said column of liquid;
   each of said variable geometry inflatable seals are configured as a doughnut with a hole who's dimensions vary as a function of pneumatic pressure within said doughnut structure;
   an upper idler wheel to guide said endless chain through said column of liquid from an exit of said airlock to the top of said column of liquid;
   a lower idler wheel to guide said endless chain outside of said column of liquid from said upper idler wheel to an entrance into said airlock whereby each of said liquid displacers comprising said endless chain sequentially enter a lower section of said column of liquid via said airlock, exit said top of said column of liquid and reenter said airlock to complete an endless recirculating sequence passing each of said displacers sequentially and repeatedly from said airlock exit to said upper idler wheel;
   a shaft supporting each of said idler wheels;
   a power takeoff driven by one of said shafts;
   means for generating electricity driven by one of said idler wheels; and
   means for replenishing said column of liquid.

15. A buoyancy driven apparatus as defined by claim 14, wherein said means for replenishing said column of liquid comprises:
   a pump driven by one of said idler wheels for replenishing said column of liquid with liquid leaked from said airlock.

* * * * *